United States Patent [19]

Mühleisen

[11] 4,284,375
[45] Aug. 18, 1981

[54] ONE-LIP TOOL FOR DEEP DRILLING

[75] Inventor: Bruno Mühleisen, Wissgoldingen, Fed. Rep. of Germany

[73] Assignee: TBT Tiefbohrtechnik GmbH & Co., Dettingen, Fed. Rep. of Germany

[21] Appl. No.: 90,644

[22] Filed: Nov. 2, 1979

[51] Int. Cl.³ .................... B23B 31/44; B23B 27/10; B23B 51/00

[52] U.S. Cl. .................... 408/226; 408/59; 408/229; 408/705

[58] Field of Search .............. 408/57, 58, 59, 62, 408/224, 229, 230, 705

[56] References Cited

U.S. PATENT DOCUMENTS

| 841,184 | 1/1907 | Roeske | 408/59 |
| 2,895,355 | 7/1959 | Kleine | 408/59 |
| 2,935,906 | 5/1960 | Andreasson | 408/59 |
| 3,010,345 | 11/1961 | Wagner | 408/59 |
| 4,212,569 | 7/1980 | Andersson et al. | 408/59 |

FOREIGN PATENT DOCUMENTS 2819720 11/1979 Fed. Rep. of Germany ........... 408/226

Primary Examiner—Harrison L. Hinson
Attorney, Agent, or Firm—Michael J. Striker

[57] ABSTRACT

A one-lip tool for deep drilling has a drill shaft, and a clamping sleeve and a drill head arranged at the opposite ends of the drill shaft. The drill shaft has a peripheral surface including two diametrically opposite surface portions. A chip groove is provided in one of the surface portions. A reinforcing formation, such as at least one inwardly extending rib, is provided in the other opposite surface portion of the drill shaft.

8 Claims, 3 Drawing Figures

ONE-LIP TOOL FOR DEEP DRILLING

BACKGROUND OF THE INVENTION

The present invention relates to a one-lip tool for deep drilling. More particularly, it relates to one-lip tool for deep drilling which has a drill shaft with a clamping sleeve at its one end, and a drill head with a drilling blade at its other end.

One-lip tools for deep drilling of the above-mentioned general type are known in the art. The drill shaft of a known one-lip tool is formed by a profile tube and has an arcuate shaft surface which is located opposite to an axially extending chip groove of a V-shaped cross section. Such one-lip deep drilling tools are utilized for production of deep or long bores. The chip groove extends over approximately one third of the length of the initial circumference of the profile tube. The drill head which in many cases is constituted of hard alloy, is provided with axially extending guiding ridges for self-guiding.

However, the known one-lip tools for deep drilling have a small rigidity to static and dynamic forces, in the region of their drill shaft so that they have a strong tendency to bending vibrations and tensional vibrations as well as to buckling. The thus-generated vibrations during the drilling process negatively affects the quality of drilling. This leads particularly to the formation of grooves, chatter marks, twists, and noncircular bores, as well as to the reduction of life of the drill blade and guiding ridges of the drill head. Moreover, the efficiency of the tool in the sense of service life, feed and number of revolutions is substantially limited.

SUMMARY OF THE INVENTION

Accordingly, it is an object of the present invention to provide a one-lip tool for deep drilling, which avoids the disadvantages of the prior art.

More particularly it is an object of the present invention to provide a one-lip tool for deep drilling which has improved vibration characteristics.

In keeping with these objects and with others which will become apparent hereinafter, one feature of the present invention resides, briefly stated, in a one-lip tool for deep drilling which has a drill shaft provided with a chip groove in one portion of its peripheral surface, and with at least one radially inwardly extending projection formed as a rib in the diametrically opposite portion of its peripheral surface and terminating at an axial distance from a clamping sleeve and a drill head which are mounted at opposite axial ends of the drill shaft.

The manufacture of the tool is especially simple when the projection extends parallel to the axis of the drill shaft. The tool is especially advantageous when two such projections are provided one near the other so that a radially outwardly extending rib is formed therebetween. The projection may be spiral-shaped, and may start below one corner of the chip groove and terminate above the other corner of the latter. In the latter construction, the torsional vibrations are counteracted in especially favorable manner.

When the one-lip deep drilling tool is designed in accordance with the present invention, the efficiency of drilling increases as a result of essentially higher displacement per revolution unit, with at least the same service life or the tool. The quality of the bores produced is also improved. The higher displacements are of great importance, particularly for drilling deep bores in steels low in carbon, for example in carbonizing steels for piston pins, inasmuch as in this case a thicker chip is produced. A continuous chip formed thereby can be reliably broken, whereas longer chip can block the chip groove. Since the projection does not extend over the entire length of the drill shaft but terminates at axial distances from the clamping sleeve and the drill head, an especially high rigidity can be attained and the vibration conditions can be so changed that especially high quality of the bores is obtained. Also, the service life of the tool is considerably increased and the drilling noise is reduced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
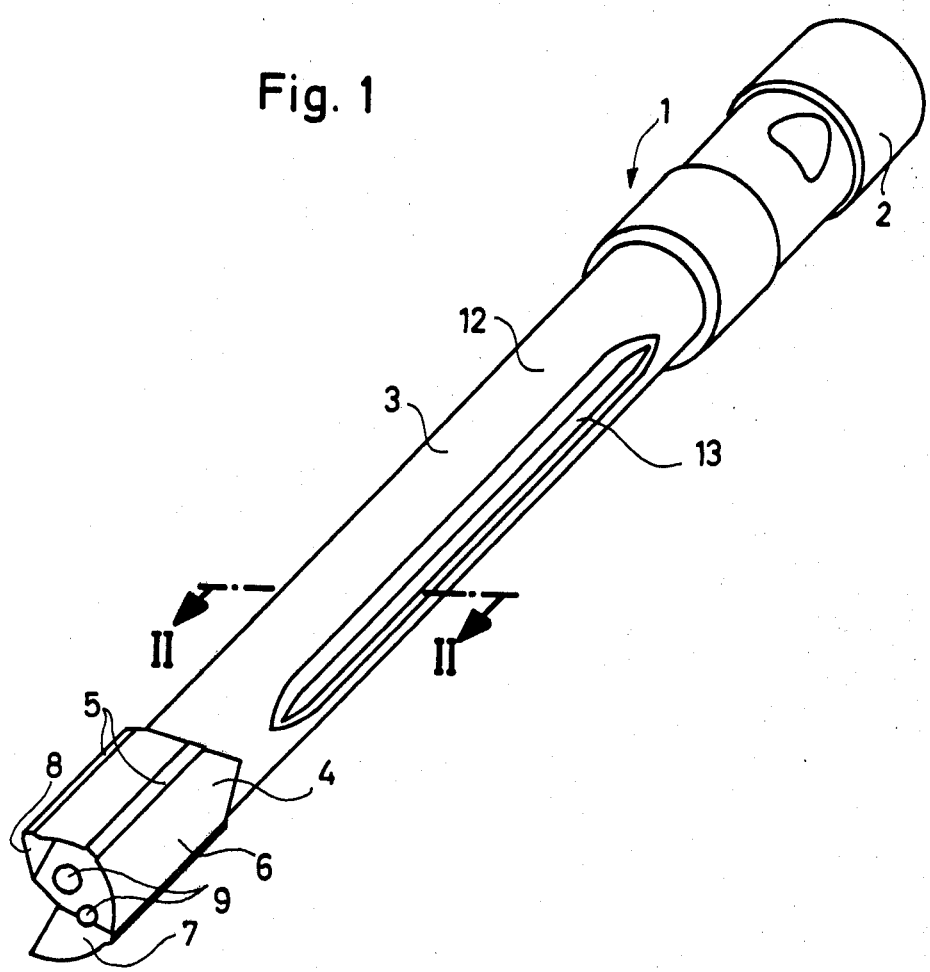
FIG. 1 is a perspective view of a one-lip tool for deep drilling, in accordance with the present invention.

A one-lip tool for deep drilling 1 has a clamping sleeve 2, a drill shaft 3 and a drill head 4 which are connected with each other, for example, by hard-soldering or compression joint. The drill head is constituted of hard alloy and has several axially extending guiding ridges 5 provided at the arcuate peripheral surface in the region of 240°. The guiding ridges 5 alternate with intermediate portions 6 which are located between the guiding ridges 5 and ground back.

The drill head 7 has a polygonal end face 7 on which a drill blade 8 is ground. Holes 9 for feeding of a cooling liquid or disposal of a chip are provided. They end at the end face 7, on the one hand, and are in communication with a hollow 10 of the drill shaft 3, on the other hand. The hollow drill shaft 3 has an axial V-shaped chip groove II for chip disposal, which is formed by rolling in when the drill shaft is manufactured from a profile tube.

A longitudinal reinforcing formation 13 is provided on an arcuate surface 12 of the shaft 3 in the region opposite to the chip groove II.

Figure 2:
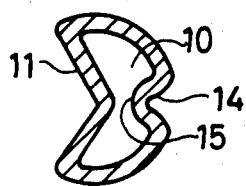
FIG. 2 is a view showing a section of the tool taken along the line II—II in FIG. 1

In the tool in accordance with the embodiment shown in FIG. 2, the reinforcing formation 13 is a fin or corrugation 14 which is formed by rolled in inwardly extending rib 15. In the shown example, the rib 15 terminates at a distance of one cm from the clamping sleeve 2 and from the drill head 4 and extends parallel to the axis of the drill shaft.

Figure 3:
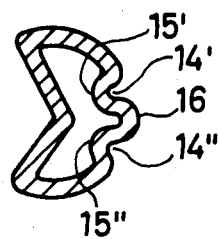
FIG. 3 is a view corresponding to that of FIG. 2, but showing another embodiment of the present invention.

In the tool in accordance with the embodiment shown in FIG. 3, the reinforcing formation 13 is composed of two fins or corrugations 14' and 14" which are rolled in so as to form an outwardly extending rib 16 and two inwardly extending ribs 15' and 15".

The rib 15 or ribs 15' and 15" may be spiral-shaped. In such a construction they may start below one corner of the chip groove 11 and terminate above the other corner of the latter. The chip groove 11 and the ribs 15 or 15" are arranged in the diametrically opposite portions of the peripheral surface of the drill shaft 3. More particularly, the chip groove 11 is arranged at the portion which is leading in the direction of rotation or in other words, corresponds to the location of the blade 8 of the drill head 4.

Therefore, the ribs 15 or 15' and 15" are arranged in the trailing portion of the peripheral surface of the drill shaft.

It will be understood that each of the elements described above, or two or more together, may also find a useful application in other types of constructions differing from the types described above.

While the invention has been illustrated and described as embodied in a one-lip tool for deep drilling, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A one-lip tool for deep drilling, comprising
   a clamping sleeve;
   a drill head having a drilling blade; and
   a drill shaft having an axis and two axial ends at one of which ends said clamping sleeve is arranged and at the other of which ends said drill head is arranged, said drill shaft having a peripheral surface including two diametrically opposite surface portions, said drill shaft having an axially extending chip groove in one of said surface portions and at least one projection in the region of the other of said surface portions, said projection forming a radially inwardly extending rib and terminating at an axial distance from said clamping sleeve and said drill head.

2. A tool as defined in claim 1, wherein said chip groove has a V-shaped cross section.

3. A tool as defined in claim 1, wherein said drill shaft is constituted of a cold-deformed profile tube.

4. A tool as defined in claim 1, wherein said other surface portion has a cross section shaped as a circular arc.

5. A tool as defined in claim 1, wherein said projection extends parallel to said axis or said drill shaft.

6. A tool as defined in claim 1, wherein said distance is equal to substantially 1 cm.

7. A tool as defined in claim 1, wherein said drill shaft further has a second such projection, said first-mentioned projection and said second projection forming therebetween an additional radially outwardly extending rib.

8. A tool as defined in claim 1, wherein the tool has a predetermined direction of rotation, said one surface portion provided with said chip groove being a leading portion, and said other surface portion provided with said projection being a trailing portion, as considered in the direction of rotation of the tool.

* * * * *